Patented Feb. 6, 1945

2,368,668

UNITED STATES PATENT OFFICE 2,368,668

PROCESS FOR THE PRODUCTION OF WHEAT STARCH

Cecil T. Langford and Richard L. Slotter, Peoria, Ill., assignors to Claude R. Wickard, as Secretary of Agriculture of the United States of America, and his successors in office No Drawing. Application December 10, 1942, Serial No. 468,590

8 Claims. (Cl. 127—68)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the production of starch, and in particular to the separation of starch from the gluten associated with it in wheat grains.

In cereal grains such as rice, rye, corn and wheat, starch is associated with various nitrogenous substances of proteid nature commonly known as glutens. These substances have various properties depending on the particular cereal grain in which they are found.

Extraction of the starch from the grain depends on the property of the particular gluten involved. For example, in the extraction of starch from rice, the rice gluten is dissolved out by employing a very weak solution of caustic soda as the solvent; isolation of rye starch is facilitated by utilization of the property of rye gluten to undergo peptization in aqueous ethyl alcohol; while in the separation of cornstarch from corn gluten a relatively simple process of sedimentation is employed. In the latter extraction process, corn kernels are levigated, the germ and vegetable fibers are eliminated by mechanical separation, and an aqueous suspension of the starch and gluten is flown through long shallow troughs known as "starch tables," allowing the heavier starch to settle out and the lighter gluten to float off with the supernatant liquor.

The behavior of wheat gluten (frequently designated by the term "gum gluten") toward water is entirely different from that of the proteinous substances present in any other cereal grain. Wheat gluten swells in water, becoming soft and sticky and forming a coherent elastic mass. As a result of this property, comminuted wheat grain materials, on contact with water, conglomerate into a plastic structure or dough which adheres tenaciously to the starch granules enmeshed therein.

The two methods most commonly used in the production of starch from wheat are the so-called Halle or Fermentation process and the Martin's process.

In the fermentation process the mashed grain is allowed to undergo a prolonged process of spontaneous fermentation, whereby the properties of wheat gluten are so modified that they no longer seriously interfere with the washing- out of the starch. The fermented mash is then agitated with water in a finely perforated vessel, thus causing a suspension of starch in water which escapes through the perforated walls of the vessel. Putrefractive processes which occur during the fermentation render the method extremely offensive in operation. Moreover, the process does not allow the wheat gluten to be recovered in a commercial form.

In the Martin's process wheat flour is worked to a dough with water, and the dough stirred and kneaded by grooved rollers which repeatedly roll out and turn over the dough on a fixed bed flanked by sieve surfaces, while the starch is washed out by jets of water. The operation of the process is extremely tedious and has the added disadvantage of yielding a relatively large proportion of inferior starch strongly contaminated with finely divided gluten from which it cannot be separated by ordinary methods of purification.

This invention obviates the disadvantages of the prior art processes enumerated above, and has among its objects the extraction of wheat starch from wheat grains in a simple manner; the obtaining of a high yield of wheat starch from the raw product; the separation of wheat starch from gluten by utilizing the comparatively simple process and apparatus used relative to the sedimentation process outlined above; the production of a wheat starch of superior quality; the production of a wheat starch of enhanced purification; the recovery in commercial form of wheat gluten; and such other objects as will be apparent from the following detailed description and appended claims.

We have discovered that treating wheat grain with water containing sulfur dioxide, resulting in a dilute sulfurous acid, prior to extraction of starch so modifies the properties of the proteinous substances present in the wheat that on subsequent treatment of the comminuted grain with water the gluten does not form an elastic dough-like mass, but is dispersed in the aqueous medium, and that the starch can then be separated from the gluten by sedimentation of an aqueous suspension of the two in a manner similar to that described above in the production of cornstarch.

In general, the invention is practiced by steeping the wheat grain in water containing sulfur dioxide. The grain is then comminuted by milling and the pulpy product is slurried with water. An aqueous suspension of starch and gluten is obtained by screening the slurry to remove the coarse particles contained therein. The screened material is then allowed to settle, yielding a sediment of wheat starch and a supernatant layer consisting of an aqueous suspension of wheat gluten.

The amount of sulfur dioxide present in the steeping water may vary within relatively wide limits, satisfactory results having been obtained by treating wheat with water containing approximately 0.03 to 0.7 gram of sulfur dioxide per 100 cc. of liquid. Ususally the yield and quality of the starch obtained are improved by the use of steeping water containing the higher concentrations of sulfur dioxide. However, the concentration of sulfur dioxide in the steeping water should be below that concentration which will cause modification of the starch due to acid hydrolysis.

The steeping of wheat is preferably carried out at temperatures of about 100° F. While the process is operable at higher temperatures, gelatinization of wheat starch occurs more readily at elevated temperatures, and temperatures below the gelatinization temperature are preferably employed.

At about 100° F. the full benefit of the steeping treatment is usually attained within 8 to 24 hours. At lower temperatures longer periods are required, while at higher temperatures shorter ones may be employed.

This invention is applicable to the production of starch from any variety of wheat, including those varieties which are unsuitable for the production of flour. The process has been successfully applied to the production of starch from such varieties of wheat as Dawson White, Durum, Red Durum, Hard Red Winter, Hard Red Spring, and the like.

The process produces satisfactory yields of good grade wheat starch by a relatively simple procedure which may be carried out with readily available equipment commonly employed in the production of cornstarch, and it permits recovery of the wheat gluten, as an aqueous suspension obtained by running the supernatant liquor from the starch tables.

We are aware that in the production of cornstarch it is common practice to inhibit the development of micro-organisms and to promote the softening of the grain by adding small amounts of sulfur dioxide to the steeping water. The gluten of corn, however, unlike that of wheat, does not form with water a coherent, plastic, dough-like mass, but is dispersed therein in finely divided particles, and the treatment of corn with water containing sulfur dioxide does not alter this behavior of the gluten in water.

The operation of the process is more specifically exhibited by the following detail description of some of its embodiments.

A portion of 908 grams soft white winter Dawson wheat was placed in a vented steeping tank connected with a closed circulatory system comprising a coil, located in a thermoregulated heating bath, and a pump, providing for circulation of the liquid from the tank through the coil and back to the tank. Water was added to about double the height of the wheat. The water was circulated through the heating coil and sulfur dioxide gas was introduced into the liquid in the tank until the odor of sulfur dioxide was detected at the vent. The temperature of the steeping liquid was adjusted to 131° F. and maintained at this level for 24 hours. The steep water was then drained off, and the steeped grain was ground in a mill, water being added to facilitate the grinding process. The pulpy ground material was given a first screening through a perforated copper plate, the openings in which had a diameter of 0.0394 inch, to eliminate coarse fibers, and the screened watery slurry was given a second screening through No. 17 standard slik bolting cloth to eliminate the finer fibers. The fiber residues were washed with water to remove adherent starch and gluten and the washings were combined with the suspension of starch and gluten obtained from the two screenings. The resultting liquor, or "mill starch," was slowly flown through a "starch table," consisting of an inclined wooden trough 12 feet long, 4 inches wide and 4 inches deep, to settle out the starch and remove the gluten suspended in the liquid flowing over the end of the table. The starch was then flushed from the table with water. The suspension so obtained was screened through a No. 17 standard silk cloth, the screened suspension was filtered, and the starch, obtained as filter cake, was washed and dried.

The resulting starch was excellent in color, had a protein content of 0.28 percent and a viscosity of 12.9 centipoises (Hoeppler), as compared with 9.74 centipoises for a commercial wheat starch. The high viscosity of the starch was surprising in view of the fact that gelatinization of wheat starch usually begins at 104° F., and it would appear that steeping at 131° F. in an acid medium would result in a modified starch of low viscosity.

Using the foregoing procedure with a steeping temperature of 98.6° F., starch was obtained from white winter Dawson wheat and from soft white winter wheat, "Rex-M-1," having viscosities of 31.2 and 19.9 centipoises, respectively.

The effect of the concentration of sulfur dioxide in the steep water on the quality and quantity of the starch obtained was determined by running a number of examples, varying the concentration of the sulfur dioxide, and keeping constant the other factors. In each 2,500 cc. water was added to 900 grams of Dawson white soft winter wheat, the sulfur dioxide was introduced into the liquid until the desired concentration was obtained, and the grain was steeped at 101° F. for 24 hours. The procedure followed was essentially the same as that previously described. In all examples the gravity of the mill starch liquor was adjusted to 2° Bé. at 100° F. The results obtained are given in Table I.

*Table I*

| Sulfur dioxide concentration, grams SO₂/100 cc. steep water: | | | | | | |
|---|---|---|---|---|---|---|
| Start | 0.056 | 0.098 | 0.195 | 0.296 | 0.401 | 0.493 |
| End | 0.025 | 0.036 | 0.105 | 0.182 | 0.261 | 0.342 |
| Yield, in per cent (dry basis): | | | | | | |
| Starch | 49.90 | 50.90 | 50.90 | 50.70 | 51.25 | 51.40 |
| Gluten | 22.35 | 21.25 | 19.80 | 22.00 | 24.35 | 24.90 |
| Protein in starch, per cent (dry basis) | 0.458 | 0.254 | 0.260 | 0.289 | 0.235 | 0.218 |
| Viscosity of starch, in centipoises (Hoeppler) | 22.2 | 25.2 | 22.1 | 23.2 | 20.0 | 21.9 |
| Color of starch | Fair to good | Fair to good | Good | Good | Very good | Very good |

Examples were also run using 60-pound batches of wheat grain and varying other factors. In each the wheat was steeped at a temperature of about 98° F. and the suspension of starch and gluten obtained by screening the milled grain stirred in water, first over a 26-mesh stainless steel wire gauge and then over No. 17 standard silk bolting cloth in a Rotex screener, was allowed to flow over a table 46 feet in length. The separation on the table was very good, as is indicated by the low protein content of the finished starches. The starches were removed from the table, washed, centrifuged, and dried at 100° F.

The liquor containing the gluten was allowed to stand until the gluten had separated from the supernatant clear liquid which was removed by decantation. The thick gluten slurry so obtained was dried in a Hurricane convection drier. The condition and the results obtained are summarized in Table II.

*Table II*

| Steeping time in hours | 44.5 | 40.5 | 23.25 |
|---|---|---|---|
| Steeping temperature °F | 98 | 97 | 98 |
| Sulfur dioxide concentration in steepwater, gram SO₂/100 cc. steepwater: | | | |
| Start | 0.330 | 0.410 | 0.660 |
| End | 0.208 | 0.274 | 0.542 |
| Yield lb. (dry basis): | | | |
| Starch | 23.70 | 24.95 | 25.70 |
| Gluten | 5.57 | 8.02 | 8.00 |
| Protein in starch per cent (dry basis) | 0.225 | 0.287 | 0.215 |
| Color of starch | Very good | Very good | Very good |

Having thus described our invention, we claim:

1. In the process of producing starch from wheat grains, the steps of treating wheat grains with a solution containing sulfurous acid to alter the properties of the nitrogenous substances forming the gluten in such manner that the gluten does not conglomerate into a plastic structure when in contact with water, whereby an aqueous suspension of the gluten and starch, which will permit separation of the starch from the gluten by settling, may be obtained from the grains of comminuting the grains, and of separating the starch from the gluten.

2. A process of separating wheat starch from wheat gluten comprising treating wheat grains with a solution containing sulfurous acid to alter the properties of the nitrogenous substance forming the gluten in such manner that the gluten does not conglomerate into a plastic structure when in contact with water, comminuting the grains, forming a watery slurry from the comminuted grains, settling the starch in the slurry, and separating the gluten therefrom.

3. A process of producing wheat gluten comprising treating wheat grains with a solution containing sulfurous acid to alter the properties of the nitrogenous substances forming the gluten in such manner that the gluten does not conglomerate into a plastic structure when in contact with water, comminuting the treated grains, forming a watery slurry from the comminuted grains, settling the starch in the slurry, and removing the supernatant liquid containing the wheat gluten.

4. A process of producing wheat starch and wheat gluten comprising treating wheat grains with water containing approximately 0.03 g. to 0.70 g. of sulfur dioxide per 100 cc. water, at such temperature and for such interval that the properties of the nitrogenous substances forming the gluten are so modified that the gluten does not conglomerate into a plastic structure when in contact with water, comminuting the treated grains, forming a watery slurry of the comminuted grains, and separating the starch and gluten by a process of sedimentation.

5. A process comprising treating wheat grains with sulfurous acid in a concentration below that which will cause modification of the wheat starch due to acid hydrolysis and at a temperature below that which will cause gelatinization of the starch, but with such concentration and temperature that for the interval of the treatment the properties of the wheat gluten are so altered that it will not conglomerate into a plastic structure when in contact with water, comminuting the grains, forming a watery slurry of the comminuted grains, and removing the starch by a process of sedimentation.

6. A process comprising steeping wheat grains in water to which sulfur dioxide has been added in concentrations of from 0.03 g. to 0.70 g. sulfur dioxide for 100 cc. water, at a temperature of approximately 100° F. and for such an interval that the properties of the wheat gluten contained in the grains are so altered that it will not conglomerate into a plastic structure when in contact with water, comminuting the grains, forming a watery slurry of the comminuted grains, screening the slurry to remove the fibers and to obtain an aqueous suspension of wheat starch and wheat gluten, and separating the wheat starch and wheat gluten by a process of sedimentation.

7. In the process of producing starch from wheat grains, the steps of treating wheat grains with a solution containing sulfurous acid to alter the properties of the nitrogenous substances forming the gluten in such manner that the gluten does not conglomerate into a plastic structure when in contact with water, whereby an aqueous suspension of gluten and starch, which will permit separation of the starch from the gluten by settling, may be obtained from the grains, of comminuting the grains, of forming a watery slurry from the comminuted grains, of separating the coarse particles from the slurry, and of separating the starch from the gluten in the slurry.

8. In the process of producing starch from wheat grains, the steps of treating wheat grains with water containing from 0.03 g. to 0.70 g. of sulfur dioxide per 100 cc. of water at a temperature of approximately 100° F., thereby to so alter the properties of the wheat gluten in the grain that the gluten will not conglomerate into a plastic structure when in contact with water, of comminuting the grains, and of separating the starch from the gluten contained in the comminuted grains.

CECIL T. LANGFORD.
RICHARD L. SLOTTER.